United States Patent [19]

Coué

[11] Patent Number: 4,494,944
[45] Date of Patent: Jan. 22, 1985

[54] DEVICE FOR MOUNTING A DERAILLEUR ON THE FRAME LUG OF A CYCLE

[75] Inventor: Maurice E. L. Coué, Feucherolles, France

[73] Assignee: Huret et ses Fils, Nanterre, France

[21] Appl. No.: 393,070

[22] Filed: Jun. 28, 1982

[30] Foreign Application Priority Data

Jul. 3, 1981 [FR] France ............................. 81 13117

[51] Int. Cl.³ .............................................. F16H 11/08
[52] U.S. Cl. ...................................... 474/82; 280/238; 474/80
[58] Field of Search ........................ 474/78, 80, 81, 82; 280/238, 288; 248/291, 293

[56] References Cited

U.S. PATENT DOCUMENTS

| 1,483,763 | 2/1924 | Anderson | 248/291 X |
| 1,790,333 | 1/1931 | Tubman | 248/293 |
| 3,984,003 | 10/1976 | Gilreath | 248/291 X |
| 4,174,851 | 11/1979 | Huret | 474/80 X |
| 4,235,118 | 11/1980 | Huret | 474/82 |
| 4,306,871 | 12/1981 | Nagano | 474/82 |

Primary Examiner—Lawrence J. Staab
Assistant Examiner—Dwight G. Diehl
Attorney, Agent, or Firm—Trexler, Bushnell & Wolters, Ltd.

[57] ABSTRACT

The derailleur is shown in a retracted position allowing the dismantling of the rear wheel of the cycle. In this retracted position, it is maintained by an abutment which is rigid with the fixed part of the derailleur and is resiliently retained in a cavity defined by the concavity of a resiliently yieldable strip carried by a member fixed to the frame lug. In the operative position, the abutment is applied against the support surface of the lug.

7 Claims, 4 Drawing Figures

DEVICE FOR MOUNTING A DERAILLEUR ON THE FRAME LUG OF A CYCLE

The present invention relates to a device for mounting, on the frame lug of a cycle, a derailleur which is mounted to be pivotable about a pin parallel to the spindle of the wheel and carried by the frame lug and is biased toward an operative position defined by the contact of an abutment mounted on the derailleur with a support surface which is fixed with respect to the frame lug.

In a cycle equipped with such a device, known in particular from the French Pat. No. 2 427 243 in the name of the Applicant, when it is desired to dismantle the rear wheel, it is possible to pivot the derailleur downwardly, but it is then necessary to retain by hand the pivoted derailleur out of its operative position during the operation for dismantling the wheel. This requirement, not only creates a hindrance for the cyclist, but also tends to prolong the duration of the immobilisation of the cycle in the event of punctures, which is a serious drawback when the cycle is engaged in a competition.

In order to overcome this drawback, the invention provides a device of the type mentioned hereinbefore, wherein, in the course of the angular displacement of the derailleur in the direction which moves the abutment away from the support surface, the abutment co-operates with means which are fixed relative to the frame lug and are adapted to elastically retain the abutment in a retracted position in respect of which the derailleur is spaced away from its operative position and immobilised, which gives access to the spindle of the rear wheel mounted on the frame lug.

With this arrangement, the cyclist keeps his two hands free while he is occupied with the dismantling and the remounting of the rear wheel. The return of the derailleur to the operative position is of course achieved by a thrust exerted on the derailleur which overcomes the elastic retaining action exerted on the abutment.

According to another feature of the invention, the abutment is, in the operative position and on the opposite side to the support surface, adjacent to a stop surface formed in an elastically yieldable strip of generally circumferential orientation with respect to the pivot axis of the derailleur which is rigid with the lug and defines by its concavity a recess in which the abutment can be retained upon its displacement in the direction which separates it from the support surface under the effect of the deformation and of the passage through the stop surface due to the circumferential thrust exerted by the abutment.

The stop surface is advantageously formed by an end side wall, constituting a ramp, of an end boss of the elastically yieldable strip in contact with which the sliding of the abutment causes a deformation of the strip which allows the passage of the abutment followed by an elastic return of the strip ensuring the retention. The action of the abutment on the other side wall of the boss, beyond its retaining position, obviously produces, by elastic deformation, a disengagement of the abutment and a return of the derailleur to the operative position.

Conventionally, the cable which is connected to the moving part of the derailleur for controlling the speed ratio changes, is either mounted inside a sheath whose corresponding end is in abutting relation to the fixed part of the derailleur, or bare, in which case a cable guiding channel is provided which is fixed with respect to the frame lug, and retaining means are also provided for preventing the whole of the derailleur from pivoting about its pivot axis when a pull is exerted on the cable for changing the speed ratio. According to the invention, this retaining function with respect to the fixed part of the derailleur is ensured directly by the stop surface of the elastically yieldable strip.

The invention will be explained in the ensuing description with reference to the accompanying drawings in which.

Figure 1:
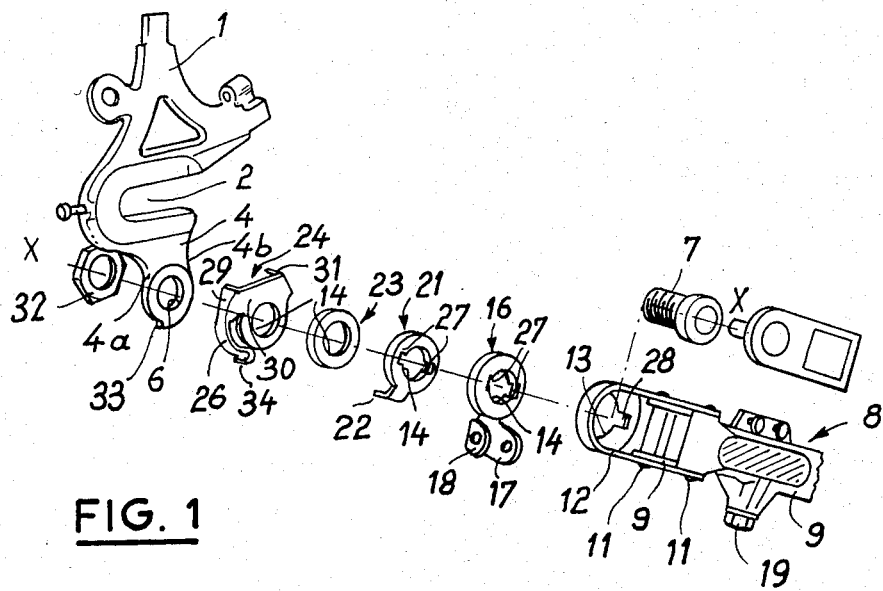
FIG. 1 is an exploded view of a device according to the invention for mounting a derailleur on a frame lug.
Figure 3:
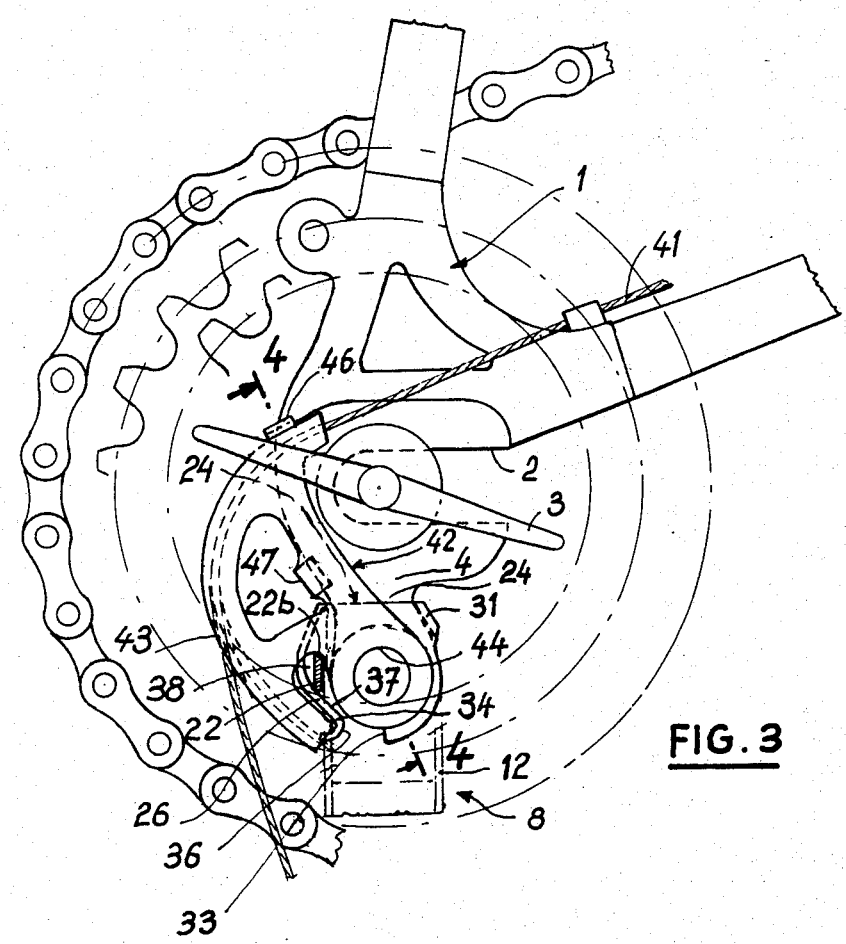
FIG. 3 is a partial diagrammatic view of a derailleur which is pivotally mounted on a frame lug, in the retracted position under the control of a cable guided in a channel.
Figure 4:
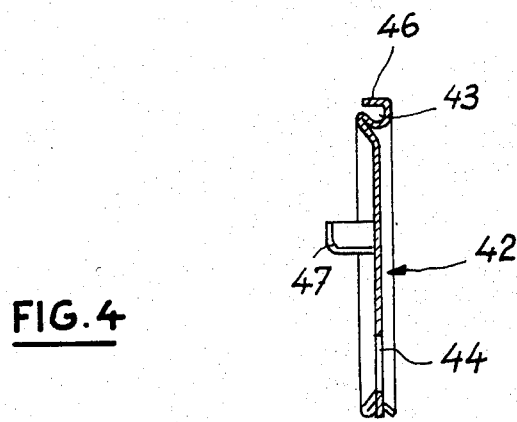
FIG. 4 is a sectional view taken along line 4—4 of FIG. 3, of the channel cable guide.

The frame lug of a cycle, shown in FIGS. 1 and 3, which comprises a notch 2 for receiving the spindle of the rear wheel of a vehicle, for example fixed by means of wing nuts 3, is extended downwardly and forms a plate 4 in which is provided a tapped aperture 6 for receiving a screw 7 having an axis X—X which constitutes the pivot axis of a derailleur shown partly at 8.

In the illustrated embodiment, this derailleur is an articulated parallelogram structure and comprises for this purpose two parallel arms 9 which are pivotally mounted by pins 11 on the two other sides of the parallelogram structure, one of the sides 12, in the shape of a U, which is the only one shown, may be considered to be a base member adapted to be in a fixed position relative to the lug plate 4 in operation of the deraileur whereas the other side supports, in the known manner, a chain guide roller and a chain tensioning roller through a yoke.

The pivot pin 7 of the derailleur which is retained in the U-shaped base member 12 extends in succession through a circular opening 13 in the latter and a stack of elements of generally planar shape, which for this purpose comprise each a center opening 14, namely:

a guide washer 16 which comprises two tabs 17 and 18 provided with coinciding orifices provided respectively for guiding the control cable of the derailleur (not shown in FIG. 1), which is hooked to one of the arms 9 by means of screw 19, and for acting as an abutment for the sheath of this cable;

an abutment washer 21 on the periphery of which is formed a tab portion 22 bent at 90°;

a friction washer 23;

a retaining member 24 which carries a resiliently yieldable strip 26 which has a generally circumferential orientation.

The guide washer 16 and the abutment washer 21 are immobilised relative to the fixed U-shaped element 12 of the derailleur by means of finger members 27 which are engaged in notches 28 formed on the periphery of the opening 13.

With regard to the retaining member 24, it is rigid with the frame lug 1 and its planar portion 30 comprises for this purpose two lateral flanges 29, 31 applied against the two corresponding edges 4a, 4b of the plate 4 of the frame lug 1, the flange 29 constituting the base or start of the peripheral spring 26.

In the assembled state, the pin 7 is screwed in the tapped aperture 6 of the plate 4 and is locked by a locknut 32.

The tightening of the screw 7, which forms the assembly pin, in the tapped aperture 6, is achieved in such manner that the derailleur 8 is pivotable about its pin in such manner as to assume, either the normal operative position corresponding to FIG. 1, or a retracted position, offset in the clockwise direction relative to the operative position, so as to permit the removal of the rear wheel of the cycle.

Figure 2:
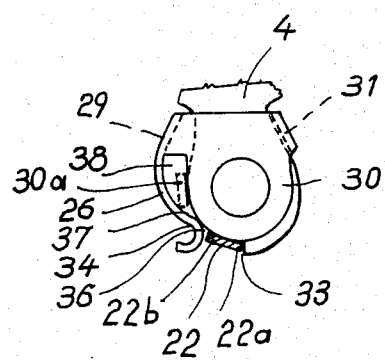
FIG. 2 is an elevational view of a retaining element employing a resiliently yieldable strip.

In the operative position, the derailleur, which is biased by the tension of the chain in the counterclockwise direction (FIGS. 1 and 3), is retained by the corresponding axial edge 22a of the tab portion 22 of the abutment washer 21 engaged with a radial support surface 33 of the plate 4 defined by a step formed in the lower part of the periphery of this plate. The other axial edge 22b of the tab portion 22 is then directly adjacent to a stop surface defined by the end 34, which is rolled in the form of a boss, of the spring 26 of the retaining member 24. On each side of its point of contact with the circular contour 30a of the planar portion 30 of this member, the boss 34 forms two ramps of opposite direction 36, 37 so that, when the derailleur is shifted by hand from the operative position in the clockwise direction, the edge of the tab portion 22b engages the stop surface constituted by the ramp 36 and urges radially outwardly the boss 34 which then passes over the tab portion 22, and the latter is finally retained by the ramp 37 inside the cavity 38 defined by the concavity of the spring 26 and the circular edge 30a, in the position shown in dotted line in FIG. 2 and in full line in FIG. 3, in which the derailleur is retracted.

The return to the operative position may of course be achieved by exerting a circumferential thrust in the counter-clockwise direction on the derailleur, the effect of which is to overcome the resilient retaining action of the boss 34.

In the modification shown in FIG. 3 which corresponds to the retracted position of the derailleur, the control of the latter is ensured by a cable devoid of a sheath, so that the guiding washer 16 is eliminated and replaced by a cable guide 42 fixed on the frame lug 1 and including an edge 43 which is shaped as a channel in which the control cable 41 passes. The cable guide 42 comprises a circular opening 44 through which the pivot pin 7 extends and a positioning projection 47 which is applied against the adjacent edge of the fame lug. Another projection 46 is provided on the cable guide 42 for preventing the cable 41 from escaping from the channel 43 when it becomes slack in the withdrawn position of the derailleur shown in FIG. 3.

Note that in the operative position of the derailleur shown in FIG. 3, any pull exerted on the cable 41 by the actuating lever (not shown) tends to urge the whole of the derailleur in the clockwise direction so that the edge of the tab portion 22b applied against the ramp 36 of the boss 34 constitutes a bearing point for the fixed part of the derailleur, the moving part of which can then respond to the pull exerted by the cable and produce the required speed ratio change.

It will be understood that the plate 4 in which the pin 7 for mounting the derailleur is fixed, may be part of a support which is distinct from the frame lug 1 and is fixed on this lug.

Having now described my invention what I claim as new and desire to secure by Letters Patent is:

1. A device for mounting a chain derailleur on a frame lug having a notch of a cycle having a wheel and a wheel spindle engaged in the notch of the lug, said device comprising a base member of the derailleur, a pivot carried by the lug in a position parallel to the spindle for pivotally mounting the base member of the derailleur on the lug, means for pivotally biasing the base member of the derailleur about said pivot toward an operative position of the derailleur, means defining an abutment rigid with the base member of the derailleur, means defining a support surface which is rigidly fixed relative to the frame lug, said operative position being determined by abutment of the abutment against the support surface upon a pivoting of the base member about said pivot in a first direction, a resiliently yieldable retaining means which is fixed in position relative to the frame lug, is in angularly spaced relation to said support surface relative to said pivot and has a retaining position in which retaining position the retaining means is encountered by the abutment in the course of an angular displacement of the base member of the derailleur in a second direction opposed to said first direction about said pivot, said retaining means being resiliently yieldable upon exertion of sufficient torque on said base member in said second direction about said pivot so as to allow said abutment to assume a position on an opposite side of said retaining means relative to said support surface and being capable of resuming said retaining position when said abutment is on said opposite side for resiliently retaining the abutment in a position in which the derailleur is spaced away from said operative position and immobilized so as to give access to the wheel spindle, said retaining means being in substantially close proximity to the abutment when the abutment is an abutting relation to the support surface.

2. A device according to claim 1, wherein the retaining means comprises a resiliently yieldable strip which defines a stop surface and has a generally circumferential orientation with respect to the pivot has a first end which is rigid with the lug and a second end which is free and remote from said first end, the strip defining by a concave side thereof a cavity adjacent said first end in which cavity may be retained the abutment when the abutment is on the opposite side of the stop surface relative to the support surface, the strip further defining said stop surface adjacent said second end.

3. A device according to claim 2, wherein the resiliently yieldable strip has a boss which has two ramps, one of which ramps constitutes said stop surface, the abutment being cooperative with the ramps of the boss so that pivoting of the abutment in either direction about said pivot causes a resilient deformation of the strip allowing passage of the abutment alongside the boss.

4. A device according to claim 2 or 3, wherein a retaining member carries the resiliently yieldable strip and means to fix the retaining member to the frame lug, the pivot of the derailleur extending through the retaining member.

5. A device according to any one of the claims 1 to 3, wherein the abutment is constituted by a tab portion formed on the periphery of a washer through which washer the pivot of the derailleur extends.

6. A device according to any one of the claims 1 to 3, comprising a channel which is fixed relative to the frame lug for guiding a bare cable controlling a moving part of the derailleur, said retaining means defining an abrupt slope relative to the direction of pivoting of the abutment about said pivot so that said slope can act as stop means for the abutment in normal operation of the derailleur when said cable is pulled, which stop means is however resiliently deformable to allow travel of the abutment beyond said stop means and permit the spacing of the derailleur away from its operative position when a torque is exerted on the abutment which exceeds torque to which said abutment is normally subjected in normal operation of the derailleur.

7. A device according to claim 6, wherein the channel for guiding the cable is formed in a member through which the pivot of the derailleur extends.

* * * * *